(12) United States Patent
Chen et al.

(10) Patent No.: US 12,532,012 B2
(45) Date of Patent: Jan. 20, 2026

(54) NETWORK BASED IMAGE FILTERING FOR VIDEO CODING

(71) Applicant: BEIJING DAJIA INTERNET INFORMATION TECHNOLOGY CO., LTD., Beijing (CN)

(72) Inventors: Wei Chen, San Diego, CA (US);
Xiaoyu Xiu, San Diego, CA (US);
Yi-Wen Chen, San Diego, CA (US);
Hong-Jheng Jhu, San Diego, CA (US);
Che-Wei Kuo, San Diego, CA (US);
Xianglin Wang, San Diego, CA (US);
Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 38 days.

(21) Appl. No.: 18/426,274

(22) Filed: Jan. 29, 2024

(65) Prior Publication Data
US 2024/0205436 A1    Jun. 20, 2024

Related U.S. Application Data

(63) Continuation of application No. PCT/US2022/038711, filed on Jul. 28, 2022.
(Continued)

(51) Int. Cl.
*H04N 19/436* (2014.01)
*G06N 3/0895* (2023.01)
(Continued)

(52) U.S. Cl.
CPC ......... *H04N 19/436* (2014.11); *G06N 3/0895* (2023.01); *H04N 19/124* (2014.11);
(Continued)

(58) Field of Classification Search
CPC .... G06N 3/0464; G06N 3/048; G06N 3/0495; G06N 3/084; G06N 3/0895;
(Continued)

(56) References Cited

U.S. PATENT DOCUMENTS 10,223,635 B2    3/2019    Annapureddy et al.
11,276,002 B2    3/2022    Keskar et al.
(Continued)

FOREIGN PATENT DOCUMENTS

CN    112417765 A    2/2021
EP    3846109 A2    7/2021
(Continued)

OTHER PUBLICATIONS

The Extend International Search Report of Application No. PCT/CN2022/038711,Dated on Nov. 15, 2022,(3P).
(Continued)

*Primary Examiner* — Md N Haque
(74) *Attorney, Agent, or Firm* — Arch & Lake LLP; Hao Tan; Shen Wang

(57) ABSTRACT

A method and an apparatus for hybrid training of neural networks for video coding are provided. The method includes: obtaining, in an offline training stage, an offline trained network by training a neural network offline; and refining, in an online training stage, a plurality of neural network layers with constraint on a plurality of parameters of the plurality of neural network layers, where the plurality of neural network layers may include at least one neural network layer in the offline trained network or in a simple neural network connected to the offline trained network.

14 Claims, 14 Drawing Sheets

Related U.S. Application Data

(60) Provisional application No. 63/227,314, filed on Jul. 29, 2021.

(51) Int. Cl.
*H04N 19/124* (2014.01)
*H04N 19/136* (2014.01)
*H04N 19/463* (2014.01)
*H04N 19/176* (2014.01)

(52) U.S. Cl.
CPC ......... *H04N 19/136* (2014.11); *H04N 19/463* (2014.11); *H04N 19/176* (2014.11)

(58) Field of Classification Search
CPC .. H04N 19/117; H04N 19/124; H04N 19/136; H04N 19/176; H04N 19/436; H04N 19/463
See application file for complete search history.

(56) References Cited

U.S. PATENT DOCUMENTS

| | | |
|---|---|---|
| 2016/0217369 A1 | 7/2016 | Annapureddy et al. |
| 2019/0188568 A1 | 6/2019 | Keskar et al. |
| 2019/0370638 A1 | 12/2019 | Green et al. |
| 2020/0126556 A1* | 4/2020 | Mosayyebpour ..... G10L 15/063 |
| 2020/0130177 A1* | 4/2020 | Kolouri ................. G06N 3/084 |
| 2020/0287814 A1* | 9/2020 | Zhao ..................... G06N 3/084 |
| 2021/0267006 A1* | 8/2021 | Pezeshki ............... G06N 3/045 |
| 2022/0345756 A1* | 10/2022 | Kroon ................. H04N 21/816 |

FOREIGN PATENT DOCUMENTS

| | | |
|---|---|---|
| WO | 2022182265 A1 | 9/2022 |
| WO | 2022187409 A1 | 9/2022 |

OTHER PUBLICATIONS

Rongqun Lin, et al., "Towards Modality Transferable Visual Information Representation with Optimal Model Compression", arXiv:2008.05642v1[eess.IV] Aug. 13, 2020, (10p).

The extended European search report issue in Application No. 22850329.8, dated May 16, 2025, (12p).

* cited by examiner

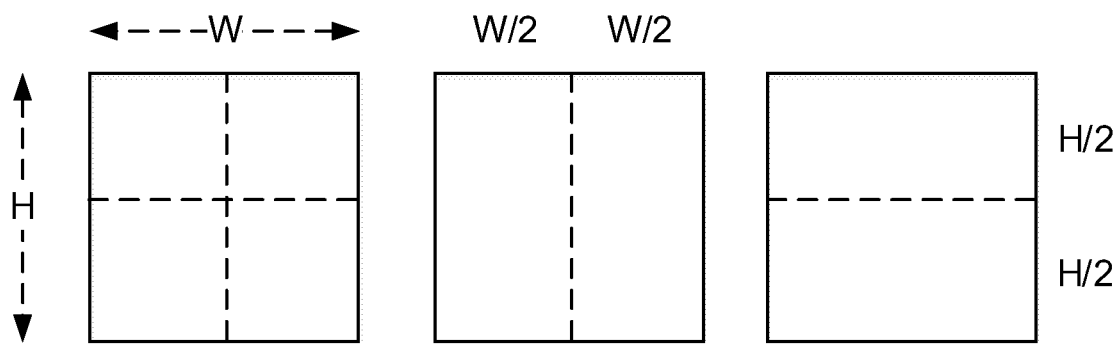
FIG. 3A   FIG. 3B   FIG. 3C
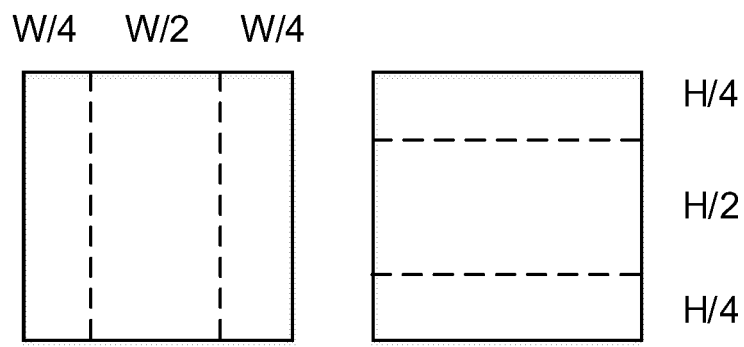
FIG. 3D   FIG. 3E

Obtain, in an offline training stage, an offline trained network by training a neural network offline  1101

Refine, in an online training stage, a plurality of neural network layers with constraint on a plurality of parameters of the plurality of neural network layers, where the plurality of neural network layers may include at least one neural network layer in the offline trained network or in a simple neural network connected to the offline trained network  1102

FIG. 11

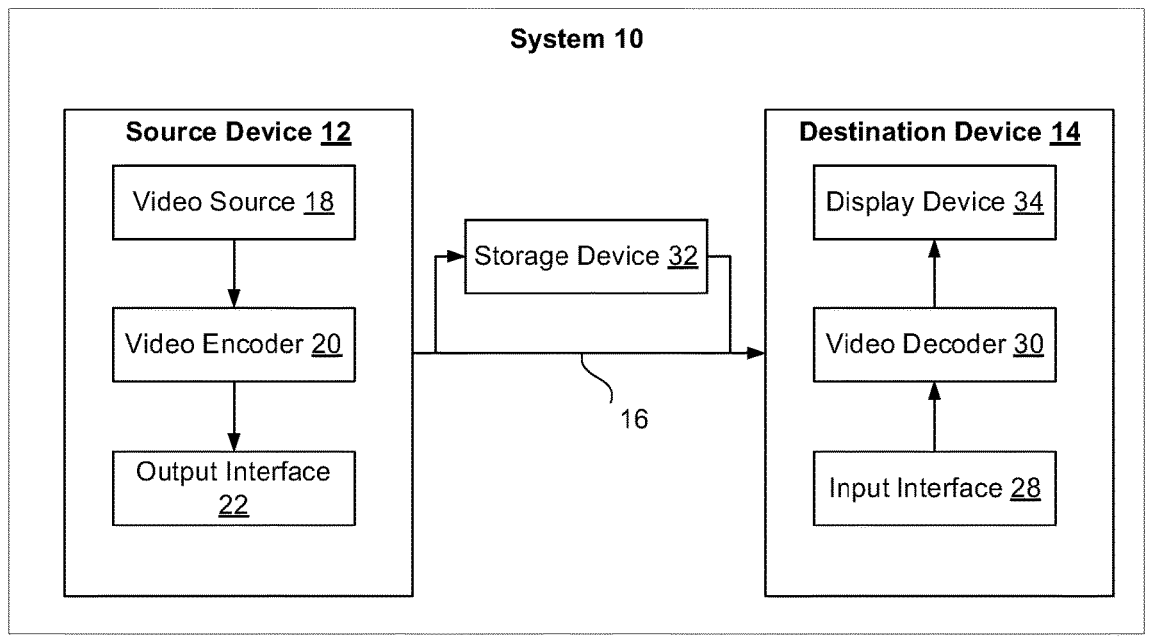

FIG. 12

NETWORK BASED IMAGE FILTERING FOR VIDEO CODING

CROSS-REFERENCE TO RELATED APPLICATIONS

The present application is a continuation of International Application No. PCT/US2022/038711, entitled "Network Based Image Filtering for Video Coding", filed on Jul. 28, 2022, which claims priority to U.S. Provisional Application No. 63/227,314, entitled "Methods and Apparatus for Hybrid Training of Neural Networks for Video Coding," filed on Jul. 29, 2021, the entire disclosures of which are incorporated by reference for all purposes.

BACKGROUND OF THE INVENTION

Various video coding techniques may be used to compress video data. Video coding is performed according to one or more video coding standards. For example, video coding standards include versatile video coding (VVC), joint exploration test model (JEM), high-efficiency video coding (H.265/HEVC), advanced video coding (H.264/AVC), moving picture expert group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality.

The first version of the HEVC standard was finalized in October 2013, which offers approximately 50% bit-rate saving or equivalent perceptual quality compared to the prior generation video coding standard H.264/MPEG AVC. Although the HEVC standard provides significant coding improvements than its predecessor, there is evidence that superior coding efficiency can be achieved with additional coding tools over HEVC. Based on that, both VCEG and MPEG started the exploration work of new coding technologies for future video coding standardization. one Joint Video Exploration Team (JVET) was formed in October 2015 by ITU-T VECG and ISO/IEC MPEG to begin significant study of advanced technologies that could enable substantial enhancement of coding efficiency. One reference software called joint exploration model (JEM) was maintained by the JVET by integrating several additional coding tools on top of the HEVC test model (HM).

The joint call for proposals (CfP) on video compression with capability beyond HEVC was issued by ITU-T and ISO/IEC. 23 CfP responses were received and evaluated at the 10-th JVET meeting, which demonstrated compression efficiency gain over the HEVC around 40%. Based on such evaluation results, the JVET launched a new project to develop the new generation video coding standard that is named as Versatile Video Coding (VVC). One reference software codebase, called VVC test model (VTM), was established for demonstrating a reference implementation of the VVC standard.

SUMMARY OF THE INVENTION

The present disclosure relates to video coding, and in particular but not limited to, methods and apparatus for hybrid training of neural networks for video coding. The present disclosure provides examples of techniques relating to improving video coding efficiency using a hybrid training on neural networks for video coding.

According to a first aspect of the present disclosure, there is provided a method for hybrid training of neural networks for video coding. The method includes: obtaining, in an offline training stage, an offline trained network by training a neural network offline; and refining, in an online training stage, a plurality of neural network layers with constraint on a plurality of parameters of the plurality of neural network layers, wherein the plurality of neural network layers comprise at least one neural network layer in the offline trained network or in a simple neural network connected to the offline trained network.

According to a second aspect of the present disclosure, there is provided an apparatus for hybrid training of neural networks for video coding. The apparatus includes one or more processors and a memory configured to store instructions executable by the one or more processors. Further, the one or more processors, upon execution of the instructions, are configured to perform the method according to the first aspect.

According to a third aspect of the present disclosure, there is provided anon-transitory computer-readable storage medium storing computer-executable instructions that, when executed by one or more computer processors, causing the one or more computer processors to perform the method according to the first aspect.

BRIEF DESCRIPTION OF DRAWINGS

A more particular description of the examples of the present disclosure will be rendered by reference to specific examples illustrated in the appended drawings. Given that these drawings depict only some examples and are not therefore considered to be limiting in scope, the examples will be described and explained with additional specificity and details through the use of the accompanying drawings.

FIG. 3A is schematic diagram illustrating quaternary partitioning tree splitting mode in accordance with some implementations of the present disclosure.

FIG. 3B is schematic diagram illustrating vertical binary partitioning tree splitting mode in accordance with some implementations of the present disclosure.

FIG. 3C is schematic diagram illustrating horizontal binary partitioning tree splitting mode in accordance with some implementations of the present disclosure.

FIG. 3D is schematic diagram illustrating vertical ternary partitioning tree splitting mode in accordance with some implementations of the present disclosure.

FIG. 3E is schematic diagram illustrating horizontal ternary partitioning tree splitting mode in accordance with some implementations of the present disclosure.

FIG. 11 is a flowchart illustrating a process for hybrid training on neural networks for video coding in accordance with some implementations of the present disclosure.

FIG. 12 is a block diagram illustrating a system for encoding and decoding video blocks in accordance with some examples of the present disclosure.

DETAILED DESCRIPTION OF THE INVENTION

Figure 1:
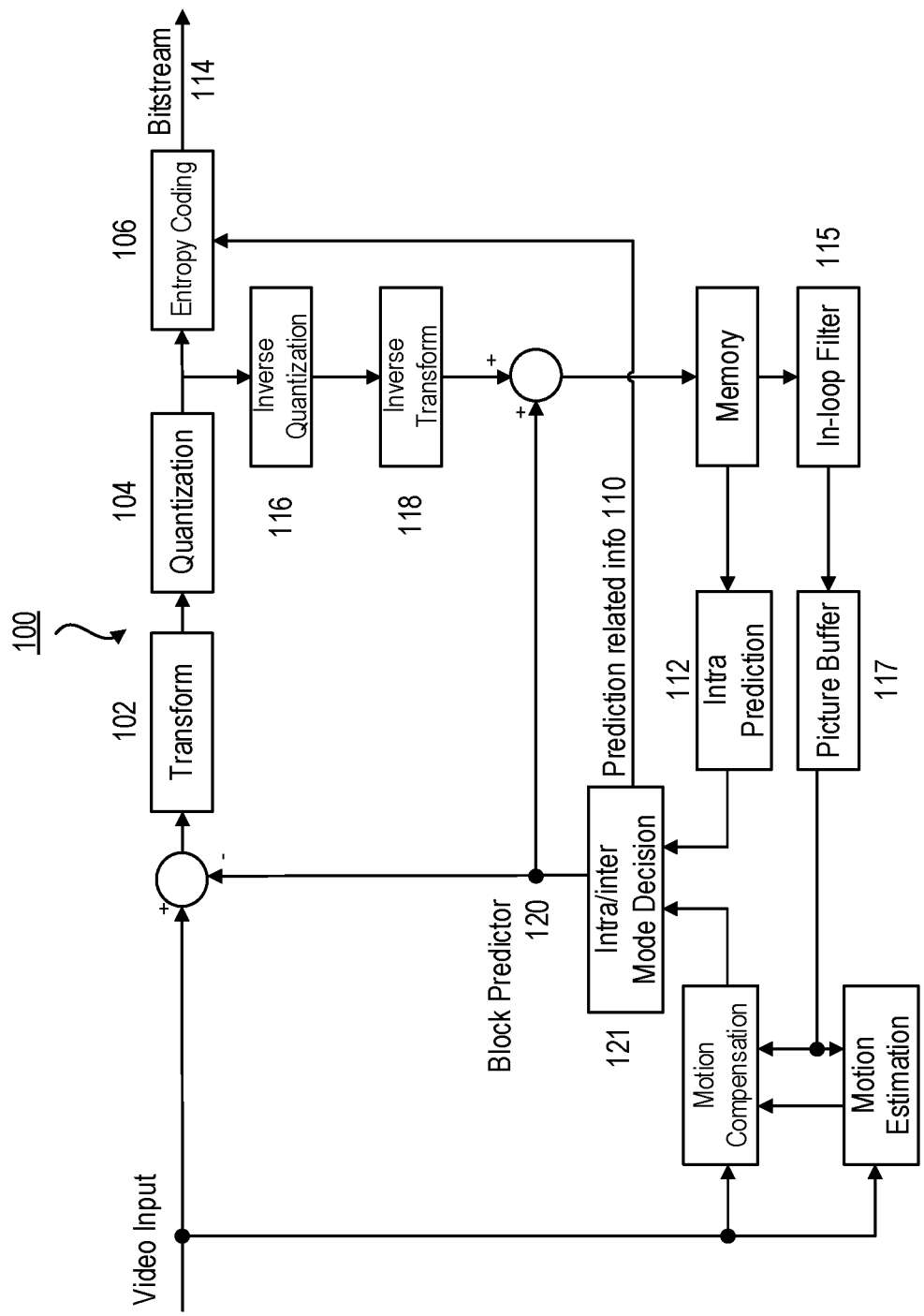
FIG. 1 is a block diagram illustrating a block-based video encoder in accordance with some implementations of the present disclosure.

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used. For example, it will be apparent to one of ordinary skill in the art that the subject matter presented herein can be implemented on many types of electronic devices with digital video capabilities.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Throughout the disclosure, the terms "first," "second," "third," etc. are all used as nomenclature only for references to relevant elements, e.g., devices, components, compositions, steps, etc., without implying any spatial or chronological orders, unless expressly specified otherwise. For example, a "first device" and a "second device" may refer to two separately formed devices, or two parts, components, or operational states of a same device, and may be named arbitrarily.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

As used herein, the term "if" or "when" may be understood to mean "upon" or "in response to" depending on the context. These terms, if appear in a claim, may not indicate that the relevant limitations or features are conditional or optional. For example, a method may comprise steps of: i) when or if condition X is present, function or action X' is performed, and ii) when or if condition Y is present, function or action Y' is performed. The method may be implemented with both the capability of performing function or action X', and the capability of performing function or action Y'. Thus, the functions X' and Y' may both be performed, at different times, on multiple executions of the method.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

FIG. 12 is a block diagram illustrating an exemplary system 10 for encoding and decoding video blocks in parallel in accordance with some implementations of the present disclosure. As shown in FIG. 12, the system 10 includes a source device 12 that generates and encodes video data to be decoded at a later time by a destination device 14. The source device 12 and the destination device 14 may comprise any of a wide variety of electronic devices, including desktop or laptop computers, tablet computers, smart phones, set-top boxes, digital televisions, cameras, display devices, digital media players, video gaming consoles, video streaming device, or the like. In some implementations, the source device 12 and the destination device 14 are equipped with wireless communication capabilities.

In some implementations, the destination device 14 may receive the encoded video data to be decoded via a link 16. The link 16 may comprise any type of communication medium or device capable of moving the encoded video data from the source device 12 to the destination device 14. In one example, the link 16 may comprise a communication medium to enable the source device 12 to transmit the encoded video data directly to the destination device 14 in real time. The encoded video data may be modulated according to a communication standard, such as a wireless communication protocol, and transmitted to the destination device 14. The communication medium may comprise any wireless or wired communication medium, such as a Radio Frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In some other implementations, the encoded video data may be transmitted from an output interface 22 to a storage device 32. Subsequently, the encoded video data in the storage device 32 may be accessed by the destination device 14 via an input interface 28. The storage device 32 may include any of a variety of distributed or locally accessed data storage media such as a hard drive, Blu-ray discs, Digital Versatile Disks (DVDs), Compact Disc Read-Only Memories (CD-ROMs), flash memory, volatile or non-volatile memory, or any other suitable digital storage media for storing the encoded video data. In a further example, the storage device 32 may correspond to a file server or another intermediate storage device that may hold the encoded video data generated by the source device 12. The destination device 14 may access the stored video data from the storage device 32 via streaming or downloading. The file server may be any type of computer capable of storing the encoded video data and transmitting the encoded video data to the destination device 14. Exemplary file servers include a web server (e.g., for a website), a File Transfer Protocol (FTP) server, Network Attached Storage (NAS) devices, or a local disk drive. The destination device 14 may access the encoded video data through any standard data connection, including a wireless channel (e.g., a Wireless Fidelity (Wi-Fi) connection), a wired connection (e.g., Digital Subscriber Line (DSL), cable modem, etc.), or a combination of both that is suitable for accessing encoded video data stored on a file server. The transmission of the encoded video data from the storage device 32 may be a streaming transmission, a download transmission, or a combination of both.

As shown in FIG. 12, the source device 12 includes a video source 18, a video encoder 20 and the output interface 22. The video source 18 may include a source such as a video capturing device, e.g., a video camera, a video archive containing previously captured video, a video feeding interface to receive video from a video content provider, and/or a computer graphics system for generating computer graphics data as the source video, or a combination of such sources. As one example, if the video source 18 is a video camera of a security surveillance system, the source device 12 and the destination device 14 may form camera phones or video phones. However, the implementations described in the present application may be applicable to video coding in general, and may be applied to wireless and/or wired applications.

The captured, pre-captured, or computer-generated video may be encoded by the video encoder 20. The encoded video data may be transmitted directly to the destination device 14 via the output interface 22 of the source device 12. The encoded video data may also (or alternatively) be stored onto the storage device 32 for later access by the destination device 14 or other devices, for decoding and/or playback. The output interface 22 may further include a modem and/or a transmitter.

The destination device 14 includes the input interface 28, a video decoder 30, and a display device 34. The input interface 28 may include a receiver and/or a modem and receive the encoded video data over the link 16. The encoded video data communicated over the link 16, or provided on the storage device 32, may include a variety of syntax elements generated by the video encoder 20 for use by the video decoder 30 in decoding the video data. Such syntax elements may be included within the encoded video data transmitted on a communication medium, stored on a storage medium, or stored on a file server.

In some implementations, the destination device 14 may include the display device 34, which can be an integrated display device and an external display device that is configured to communicate with the destination device 14. The display device 34 displays the decoded video data to a user, and may comprise any of a variety of display devices such as a Liquid Crystal Display (LCD), a plasma display, an Organic Light Emitting Diode (OLED) display, or another type of display device.

The video encoder 20 and the video decoder 30 may operate according to proprietary or industry standards, such as VVC, HEVC, MPEG-4, Part 10, AVC, or extensions of such standards. It should be understood that the present application is not limited to a specific video encoding/decoding standard and may be applicable to other video encoding/decoding standards. It is generally contemplated that the video encoder 20 of the source device 12 may be configured to encode video data according to any of these current or future standards. Similarly, it is also generally contemplated that the video decoder 30 of the destination device 14 may be configured to decode video data according to any of these current or future standards.

The video encoder 20 and the video decoder 30 each may be implemented as any of a variety of suitable encoder and/or decoder circuitry, such as one or more microprocessors, Digital Signal Processors (DSPs), Application Specific Integrated Circuits (ASICs), Field Programmable Gate Arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video encoding/decoding operations disclosed in the present disclosure. Each of the video encoder 20 and the video decoder 30 may be included in one or more encoders or decoders, either of which may be integrated as part of a combined encoder/decoder (CODEC) in a respective device.

Like HEVC, VVC is built upon the block-based hybrid video coding framework. FIG. 1 is a block diagram illustrating a block-based video encoder in accordance with some implementations of the present disclosure. In the encoder 100, the input video signal is processed block by block, called coding units (CUs). The encoder 100 may be the video encoder 20 as shown in FIG. 12. In VTM-1.0, a CU can be up to 128×128 pixels. However, different from the HEVC which partitions blocks only based on quad-trees, in VVC, one coding tree unit (CTU) is split into CUs to adapt to varying local characteristics based on quad/binary/ternary-tree. Additionally, the concept of multiple partition unit type in the HEVC is removed, i.e., the separation of CU, prediction unit (PU) and transform unit (TU) does not exist in the VVC anymore; instead, each CU is always used as the basic unit for both prediction and transform without further partitions. In the multi-type tree structure, one CTU is firstly partitioned by a quad-tree structure. Then, each quad-tree leaf node can be further partitioned by a binary and ternary tree structure.

FIGS. 3A-3E are schematic diagrams illustrating multi-type tree splitting modes in accordance with some implementations of the present disclosure. FIGS. 3A-3E respectively show five splitting types including quaternary partitioning (FIG. 3A), vertical binary partitioning (FIG. 3B), horizontal binary partitioning (FIG. 3C), vertical ternary partitioning (FIG. 3D), and horizontal ternary partitioning (FIG. 3E).

For each given video block, spatial prediction and/or temporal prediction may be performed. Spatial prediction (or "intra prediction") uses pixels from the samples of already coded neighboring blocks (which are called reference samples) in the same video picture/slice to predict the current video block. Spatial prediction reduces spatial redundancy inherent in the video signal. Temporal prediction (also referred to as "inter prediction" or "motion compensated prediction") uses reconstructed pixels from the already coded video pictures to predict the current video block. Temporal prediction reduces temporal redundancy inherent in the video signal. Temporal prediction signal for a given CU is usually signaled by one or more motion vectors (MVs) which indicate the amount and the direction of motion between the current CU and its temporal reference. Also, if multiple reference pictures are supported, one reference picture index is additionally sent, which is used to identify from which reference picture in the reference picture store the temporal prediction signal comes.

After spatial and/or temporal prediction, an intra/inter mode decision circuitry 121 in the encoder 100 chooses the best prediction mode, for example based on the rate-distortion optimization method. The block predictor 120 is then subtracted from the current video block; and the resulting prediction residual is de-correlated using the transform circuitry 102 and the quantization circuitry 104. The resulting quantized residual coefficients are inverse quantized by the inverse quantization circuitry 116 and inverse transformed by the inverse transform circuitry 118 to form the reconstructed residual, which is then added back to the prediction block to form the reconstructed signal of the CU. Further, in-loop filtering 115, such as a deblocking filter, a sample adaptive offset (SAO), and/or an adaptive in-loop filter (ALF) may be applied on the reconstructed CU before it is put in the reference picture store of the picture buffer 117 and used to code future video blocks. To form the output video bitstream 114, coding mode (inter or intra), prediction mode information, motion information, and quantized residual coefficients are all sent to the entropy coding unit 106 to be further compressed and packed to form the bit-stream.

For example, a deblocking filter is available in AVC, HEVC as well as the now-current version of VVC. In HEVC, an additional in-loop filter called SAO is defined to further improve coding efficiency. In the now-current version of the VVC standard, yet another in-loop filter called ALF is being actively investigated, and it has a good chance of being included in the final standard.

These in-loop filter operations are optional. Performing these operations helps to improve coding efficiency and visual quality. They may also be turned off as a decision rendered by the encoder 100 to save computational complexity.

In some implementations of the present disclosure, intra prediction is based on unfiltered reconstructed pixels, while inter prediction is based on filtered reconstructed pixels if these filter options are turned on by the encoder 100.

Figure 2:
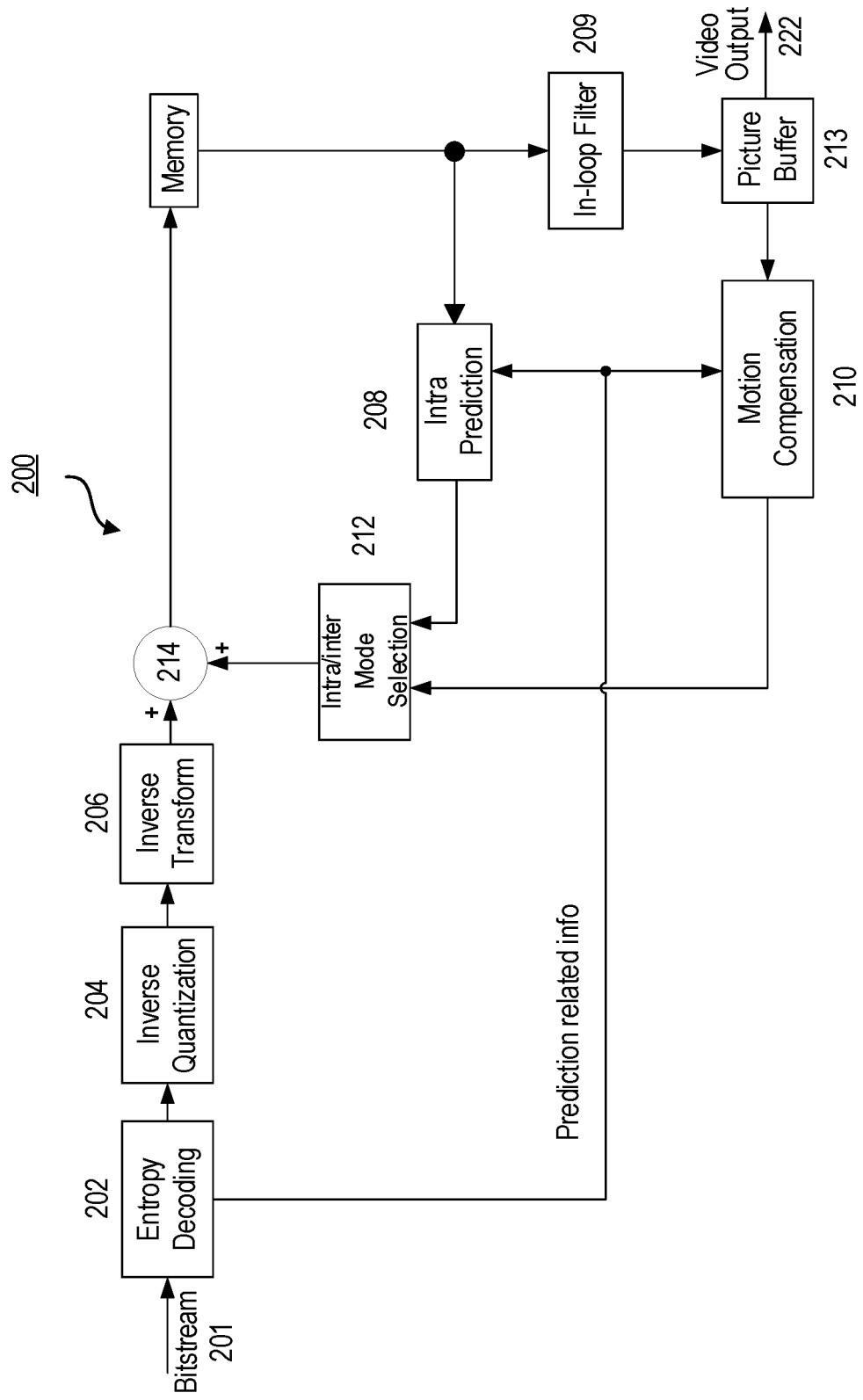
FIG. 2 is a block diagram illustrating a block-based video decoder in accordance with some implementations of the present disclosure.

FIG. 2 is a block diagram illustrating a block-based video decoder 200 which may be used in conjunction with many video coding standards. This decoder 200 is similar to the reconstruction-related section residing in the encoder 100 of FIG. 1. The block-based video decoder 200 may be the video decoder 30 as shown in FIG. 12. In the decoder 200, an incoming video bitstream 201 is first decoded through an Entropy Decoding 202 to derive quantized coefficient levels and prediction-related information. The quantized coefficient levels are then processed through an Inverse Quantization 204 and an Inverse Transform 206 to obtain a reconstructed prediction residual. A block predictor mechanism, implemented in an Intra/inter Mode Selector 212, is configured to perform either an Intra Prediction 208, or a Motion Compensation 210, based on decoded prediction information. A set of unfiltered reconstructed pixels are obtained by summing up the reconstructed prediction residual from the Inverse Transform 206 and a predictive output generated by the block predictor mechanism, using a summer 214.

The reconstructed block may further go through an In-Loop Filter 209 before it is stored in a Picture Buffer 213 which functions as a reference picture store. The reconstructed video in the Picture Buffer 213 may be sent to drive a display device, as well as used to predict future video blocks. In situations where the In-Loop Filter 209 is turned on, a filtering operation is performed on these reconstructed pixels to derive a final reconstructed Video Output 222.

When neural networks are utilized in a video coding system, the neural network models may be offline or online trained. In the present disclosure, methods and apparatus of a hybrid training framework are described in which both online and offline training methods are used to improve the video coding efficiency. For easier illustration, the present disclosure takes in-loop filtering as an example, while the proposed ideas may be extended to other functioning parts of a video coding system as well. For example, prediction mode decision or transform in FIG. 1. The proposed hybrid training methods may be applied to the traditional block-based video coding system or end-to-end neural network-based video coding systems. In one or more embodiments, the proposed neural network and the related hybrid training methods may be applied to the traditional block-based video coding system by improving or replacing one or more traditional tools. For example, the traditional tools may include the existing traditional in-loop filters such as luma mapping with chroma scaling, deblocking filter, sample adaptive offset, adaptive loop filter and cross-component adaptive loop filter. These traditional tools may be partially or completely configured or conditionally turned on/off when the proposed neural network is applied.

In other embodiments, the proposed neural network and the related hybrid training methods may be applied to end-to-end neural network-based video coding systems by adding new neural network modules/blocks or improving or replacing one or more existing neural network modules/blocks. For example, the existing neural network modules/blocks in an end-to-end neural network-based video coding system may include deep intra coding, deep inter coding, deep residual coding or/and deep entropy coding. The proposed neural network may be applied as a new supplementary network and placed anywhere between the existing modules/blocks. Alternatively or additionally, the proposed neural network may be applied to replace the existing modules/blocks by partially or completely configuring or conditionally turning on/off these existing modules/blocks.

The neural network techniques, e.g., fully connected neural network (FC-NN), convolutional neural network (CNN), and long short-term memory network (LSTM), have already achieved significant success in many research domains, including computer vision and video understanding.

Fully-Connected Neural Network (FC-NN)

Figure 4:
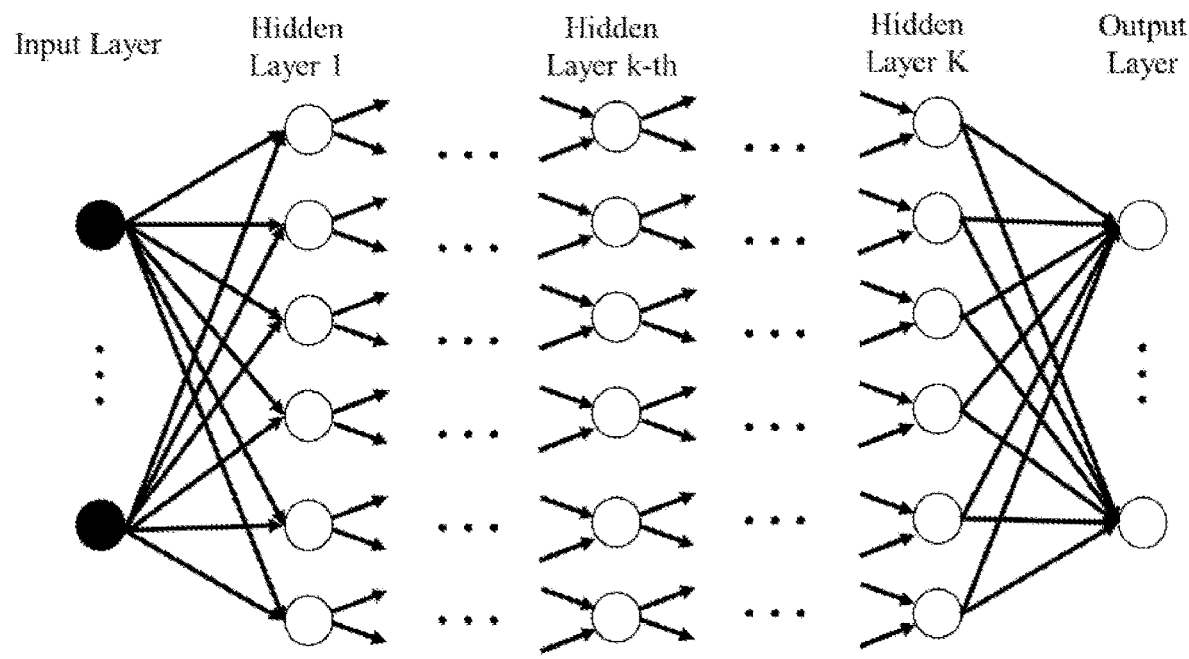
FIG. 4 illustrates a simple FC-NN consisting of input layer, output layer, and multiple hidden layers in accordance with some implementations of the present disclosure.

FIG. 4 illustrates a simple FC-NN consisting of input layer, output layer, and multiple hidden layers in accordance with some implementations of the present disclosure. At k-th layer, the output $f^k(x^{k-1}, W^k, B^k)$, is generated by $$f^k(x^{k-1},W^k,B^k)=\delta(X^{k-1}*W^k+B^k) \quad (1)$$

$$x^{k-1}*W^k+B^k=[x_1^{k-1},\ldots,x_j^{k-1},\ldots,x_M^{k-1}]\cdot \quad (2)$$

$$\begin{bmatrix} W_{1,1}^k & \cdots & W_{0,N}^k \\ \vdots & \ddots & \vdots \\ W_{M,1}^k & \cdots & W_{M,N}^k \end{bmatrix}+[B_1^{k-1},\ldots,B_j^{k-1},\ldots,B_M^{k-1}]$$

where $x^{k-1} \in R^M$ is the output of (k−1)-th layer, $W^k \in R^{M*N}$ and $B^k \in R^N$ are the weight and the bias at k-th layer. $\delta(\cdot)$ is the activation function, e.g., the Rectified Linear Unit (ReLU) function as defined in Eq. (3).

$$\delta(x)=\begin{cases} 0, & x<0 \\ x, & x \geq 0 \end{cases} \quad (3)$$

Therefore, the general form of a K-layer FC-NN is written as $$\text{FCNN}(x)=f_K(\ldots f^k(f^{k-1}(\ldots f^1(x,W^1,B^1)\ldots),W^K, B^K)\ldots,W^K,B^K), \text{ for } 1 \leq k \leq K \quad (4)$$

According to the universal approximation hypothesizes and Eq. (4), given any continuous function g (x) and some ε>0, there exists a neural network f(x) with a reasonable choice of non-linearity e.g., ReLU, such that ∀x, |g(x)−f(x)|<ε. Therefore, many empirical studies applied neural network as an approximator to mimic a model with hidden variables in order to extract explainable features under the surfaces. For example, applying in image recognition, FC-NN helps researchers to construct a system that understands not just a single pixel, but increasingly much deeper and complex sub-structures, e.g., edges, textures, geometric shapes, and objects.

Convolutional Neural Network (CNN)

Figure 5A:
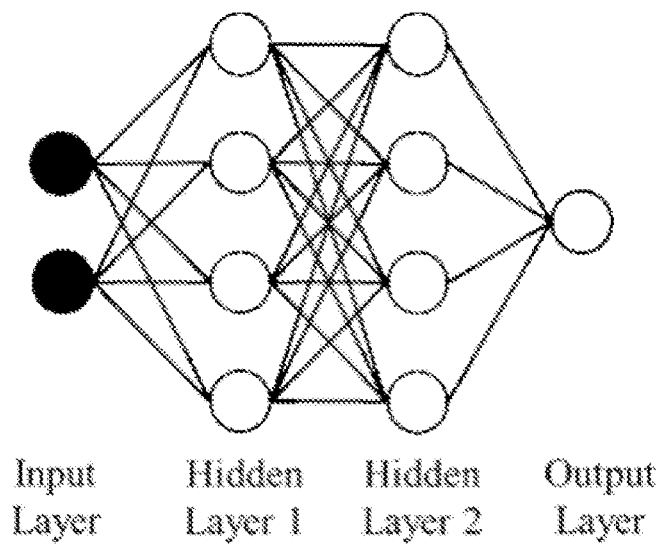
FIG. 5A illustrates an FC-NN with two hidden layers in accordance with some implementations of the present disclosure.
Figure 5B:
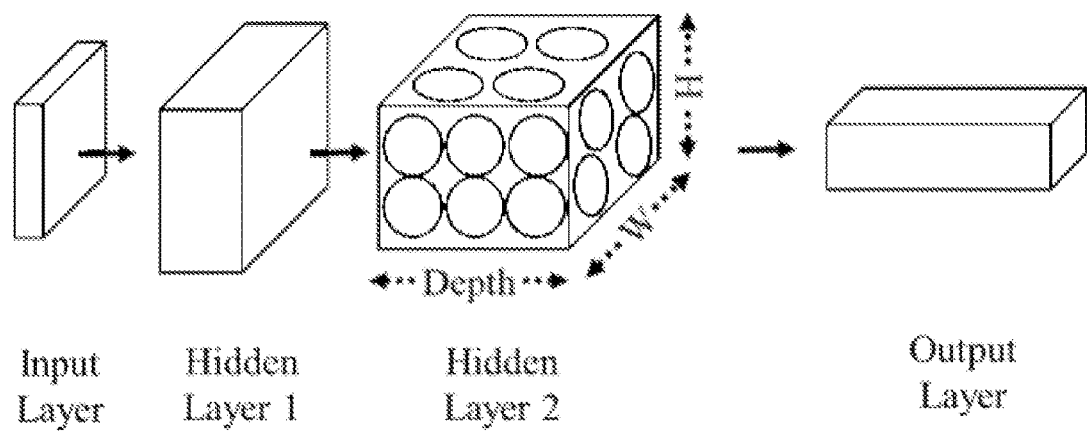
FIG. 5B illustrates an example of CNN in which the dimension of the second hidden layer is [W, H, Depth] in accordance with some implementations of the present disclosure.

FIG. 5A illustrates an FC-NN with two hidden layers in accordance with some implementations of the present disclosure. CNN, a popular neural network architecture for image or video applications, is very similar to the FC-NN as shown in FIG. 5A, which includes weights and bias metrices. A CNN can be seen as a 3-D version of neural network. FIG. 5B illustrates an example of CNN in which the dimension of the second hidden layer is [W, H, Depth] in accordance with some implementations of the present disclosure. In FIG. 5B, neurons are arranged in 3-Dimensional structure (width, height, and depth) to form a CNN, and the second hidden layer is visualized. In this example, the input layer holds input image or video frames therefore its width and height are same as input data. To apply with image or video applications, each neuron in CNN is a spatial filter element with extended depth aligned with its input, e.g., the depth is 3 if there are 3 color components in input images.

Figure 6:
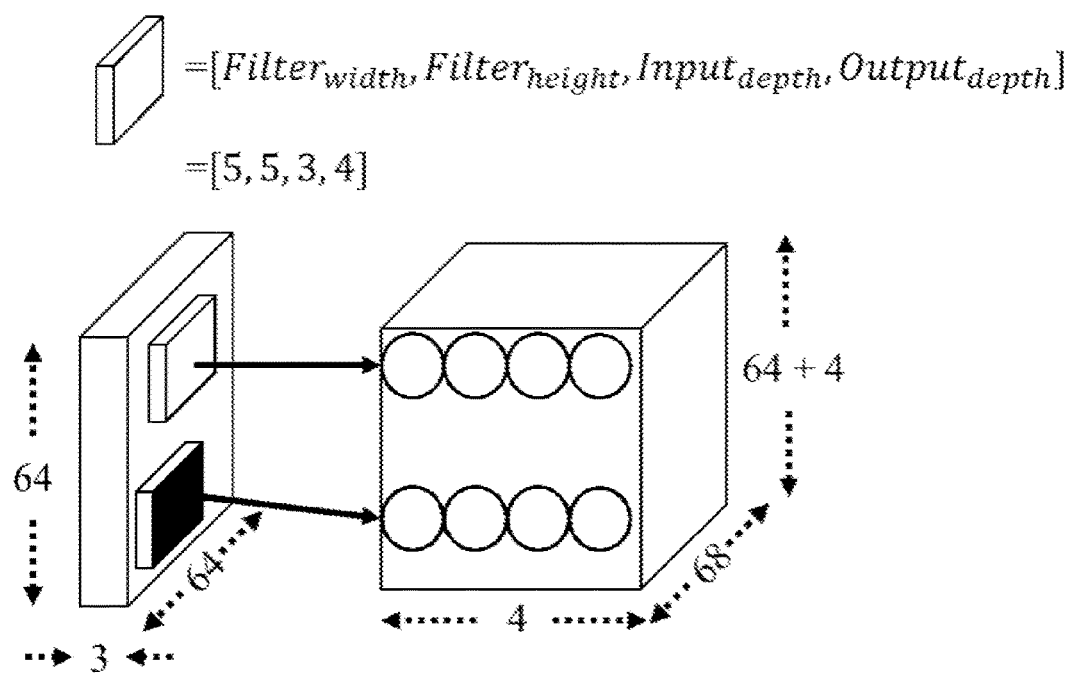
FIG. 6 illustrates an example of applying spatial filters with an input image in accordance with some implementations of the present disclosure.

FIG. 6 illustrates an example of applying spatial filters with an input image in accordance with some implementations of the present disclosure. As shown in FIG. 6, the dimension of basic element in CNN is defined as [$\text{Filter}_{width}$, $\text{Filter}_{height}$, $\text{Input}_{depth}$, $\text{Output}_{depth}$] and set to [5, 5, 3, 4] in this example. Each spatial filter performs 2-dimensional spatial convolution with 5*5*3 weights on an input image. The input image may be a 64×64×3 image. Then, 4 convolutional results are outputted. Therefore, the dimension of filtered results is [64+4, 64+4, 4] if padding the boundary with additional 2 pixels.

Residual Network (ResNet)

In image classification, the accuracy is saturated and degrades rapidly when the depth of neural network increases. To be more specifically, adding more layers on deep neural network results in higher training error because the gradient is gradually vanishing along the deep network and toward to zero gradient at the end. Then, the ResNet composed of residual blocks comes to resolve the degradation problem by introducing the identity connection.

Figure 7A:
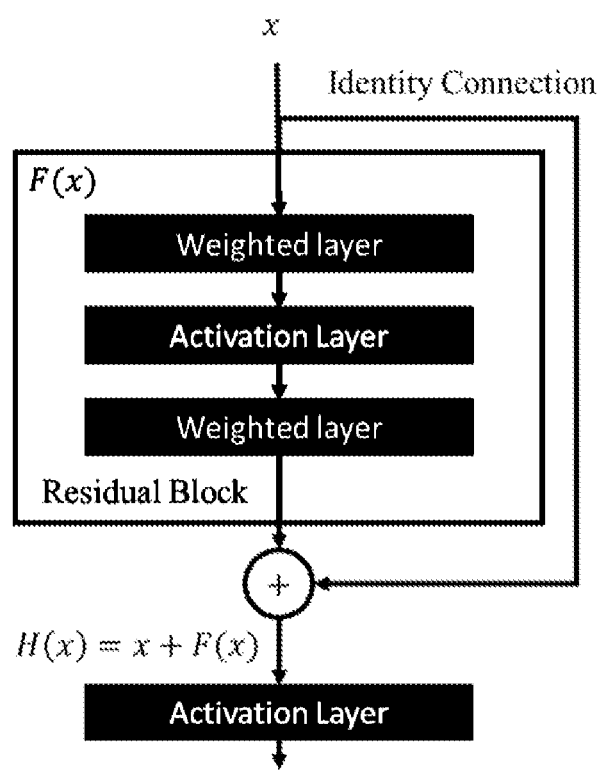
FIG. 7A illustrates a residual network (ResNet) including a residual block as the element of ResNet that is elementwise added with its input by identity connection in accordance with some implementations of the present disclosure.

FIG. 7A illustrates a ResNet including a residual block as the element of ResNet that is elementwise added with its input by identity connection in accordance with some implementations of the present disclosure. As shown in FIG. 7A, a basic module of ResNet is consist of the residual block and the identity connection. According to the universal approximation hypothesizes, given an input x, weighted layers with activation function in residual block approximate a hidden function F(x) rather than the output H(x)=F(x)+x.

By stacking non-linear multi-layer neural network, the residual block explores the features that represent the local characteristic of input images. Without introducing neither additional parameters and computational complexity, the identity connection is proven to make deep learning network trainable by skip one or more non-linear weighted layers as shown in FIG. 7A. Skipping weighted layers, the differential output of the residual layers can be written as $$\frac{\partial H(x)}{\partial x}=\frac{\partial F(x)}{\partial x}+1 \quad (5)$$

Figure 7B:
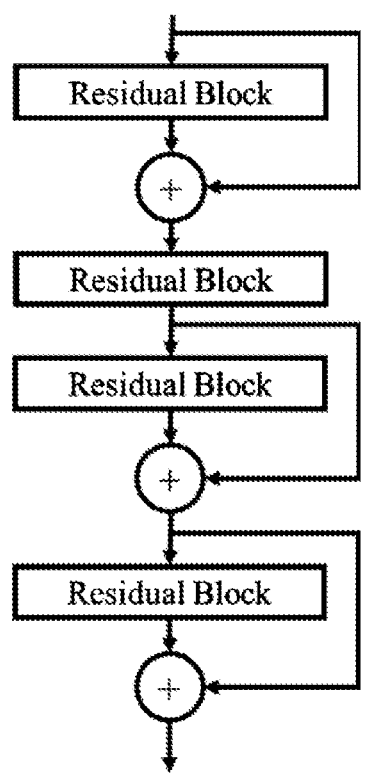
FIG. 7B illustrates an example of ResNet by staking residual modules in accordance with some implementations of the present disclosure.

Therefore, even if the differential term $$\frac{\partial F(x)}{\partial x}$$

is gradually decreasing toward zero, the identity term can still carry on and pass the input to next layer instead of stuck at zero gradient as well as blocking information propagation. If a neuron cannot propagate information to next neuron, it is seen as dead neuron, which is non-trainable element in neural network. After addition, another non-linear activation function can be applied as well. FIG. 7B illustrates an example of ResNet by staking residual modules in accordance with some implementations of the present disclosure. As shown in FIG. 7B, the residual features are fused with the identity features before propagating to the next module.

For better generalization, offline trained neural networks may include multiple layers and are iteratively updated during the training stage. The relatively large number of layers may lead to a big parameter size such that excessive processing delay and memory consumption could be observed at the inference stage. In addition, the offline trained neural network models are learned from a given data set, which may not reflect actual data characteristics, e.g., illumination, texture, object deformations, etc., when the models are applied elsewhere.

On the other hand, online trained neural networks adapt well to real application scenarios, but may be constrained with a smaller parameter size, leading to a limited utilization of the non-linear representation ability of a neural network.

For video coding systems, the ground truth, e.g., uncompressed video data, is always accessible at the encoder side, which makes online training viable. In order to explore the combined benefits, a hybrid training framework including both online and offline training are disclosed.

Hybrid Training Framework

In the present disclosure, a hybrid training framework is proposed to improve the coding efficiency of the neural networks utilized for a video coding system. The proposed hybrid training framework may include any combination of below features.

In some examples, one or multiple neural networks with the same or different network architecture may be offline trained first. The data sets selected for the offline training may include different data characteristics, e.g., still images with various background textures, videos with low-motion objects, etc., for better generalization purpose.

Then the offline trained models are refined by online training, e.g., online trained for adapting to specific video content. In this online training stage, a small number of layers may be updated only. For the layers not being updated, for example, the gradients of those layers may be forcefully set to zero if the training algorithm is gradient descent based. On a specific neural network framework, the layers not being updated may be set to not trainable, e.g., PyTorch.

In some other examples, in the online training stage, the offline trained models may be treated as feature extractors with or without further refinement, and a simple neural network with very few layers or weights may be connected after the offline trained models.

At different training stages, the same or different learning algorithms may be used. In one or more examples, at the offline training stage, where the speed of convergence is not stringent and generalization is more important, learning algorithms such as stochastic gradient descent (SGD) may be preferably used. On the other hand, at the online training stage, where both the training speed and fast fitting to the training data are critical, fast learning algorithms such as adaptive moment estimation (ADAM) may be favorably used.

In one or more examples, the switch between different algorithms may be performed within the same training stage. For example, at the offline training stage, in the beginning epochs, fast algorithms such as ADAM is used, then the learning algorithm is switched to be SGD when the loss function generates a loss below a predefined threshold value.

In some examples, when learning algorithms are switched either within the same training stage or between different training stage, a suitable starting value of the learning rate parameter may be switched as well. The specific value of the learning rate may be associated with the loss function or the algorithm itself.

For online training-based model refinement, two factors related to temporal scope include temporal frequency and temporal coverage. Temporal frequency determines when the online training-based model refinement is performed.

In one or more examples, the online training may be performed periodically, such as every two seconds, every one second, or every N video frames, where N may be a positive integer. In some examples, the online training may be triggered based on event.

In one or more examples, the online training may be triggered by the video encoder behaviors, for example, generation of an IDR (Instantaneous Decoder Refresh) coded picture. Every time a new IDR frame is generated, the subsequent motion predicted video frames may contain totally different level of artifacts, e.g., due to the change of the reference pictures.

In one or more examples, the online training can be triggered by the video encoder configurations, for example, intra period value or frame rate. The encoder configuration may be dynamically changed due to different reasons, such as bit rate control, error concealment, etc. The change of the encoder configuration may be activated by a predefined profile or the lower protocol layers of the operation systems running on the device.

In one or more examples, the online training may be triggered by the video content, for example, scene detection. When the objects, the background of the objects, or the objects and the background of the objects within a video frame is changed, the prediction, partition granularity within a video frame, or the prediction and partition granularity within the video frame is likely to be changed as well. These content changes are the main reasons where the video coding bits, coding distortions, or the video coding bits and coding distortions come from.

In some examples, the online training may be triggered in a manner of a combination of periodic and event triggering. For example, the online training may be performed periodically first and then skipped in response to a triggering event.

Furthermore, temporal coverage determines what training data are used for the model update. Speed of convergence is critical for online training. Training data not only impacts the processing delay but also the training convergence, e.g., highly diverse video data is difficult for the training to converge.

In one or more examples, the coding information such as temporal layer information may be used as reference to select training data. For example, within each group of pictures, one picture from each temporal layer may be selected for online training.

In one or more examples, the video content may be used as reference to select training data. For example, within each online training period, adjacent video frames may likely have high temporal redundancy, which means the objects and background are highly similar. In this case, scene information or regions of interest including both objects and background textures can be extracted at the encoder side, and these extracted small patches instead of the whole pictures can be used as the online training data.

In some examples, information other than video frames are also used as training data, e.g., for multi-frame-based training. For example, the motion information between each selected video frame and the anchor frame, e.g., reference pictures, may be used for training the motion predicted frames. In this case, optical flow map may be generated as the representation of motion information.

At the online training stage, each selected video frame may be split or cropped into small patches before used as online training data. The small patches may be clustered according to certain criteria. In some examples, only the patches classified as the same or different clusters are selected to be online training data.

In some examples, each small patch may be represented by a scale-invariant feature descriptor, e.g., histogram of oriented gradients or a template, e.g., bag of words, based feature vectors. Different patches are clustered by the representation similarities.

In some examples, patches are clustered by different level of distortions.

At the online training stage, the video frames or patches with lower qualities, e.g., quantization parameter is greater than a certain threshold value, may have blurred object boundaries or texture details. Therefore, those data may cause severe training confusions which make the training hard to converge and should not be selected as training data.

For video coding, offline trained neural network models are supposed to work on a variety of diverse video sequences after training thus require good generalization, while online trained neural network models need only fit the video data within a small temporal space, e.g., fits the video frames within an intra period, thus require good overfitting. Due to different requirements, the model training process can be considered in the context of the generalization-overfitting trade-off.

In one or more examples, the balance of the generalization-overfitting trade-off can be controlled by training the network on a sufficient amount of data. This has already been discussed above. For example, offline models are trained on larger and diverse data sets, while online models or model refinement are trained within a constrained temporal scope, spatial scope and quality scope.

In one or more examples, the balance of the generalization-overfitting trade-off can be controlled by changing the network complexity. In one example, the network complexity can be changed by adjusting the network structure. Specifically, the number of trainable model parameters or weights can be flexibly configured. For example, online trained networks may set only a small number of layers to be trainable, while offline trained networks may set a large number of layers or all layers to be trainable. This method can be termed as structural stabilization.

In another example, the network complexity can be changed by adjusting the dynamic range of network parameters. Parameters with small dynamic range are less sensitive to statistical fluctuations in the input training data, thus has better generalization capability. However, if overfitting is desirable, such as the online models, parameters with larger dynamical range are preferable.

In some examples, data type, e.g., integer or floating point, is used to control the dynamical range of network parameters or weight. In some other examples, regularization methods are used to control the dynamical range of network parameters or weight. One typical regularization method is to penalize the model, e.g., loss function, during training process based on the magnitude of the parameters or weights value. This approach is called weight regularization or weight decay.

Figure 8:
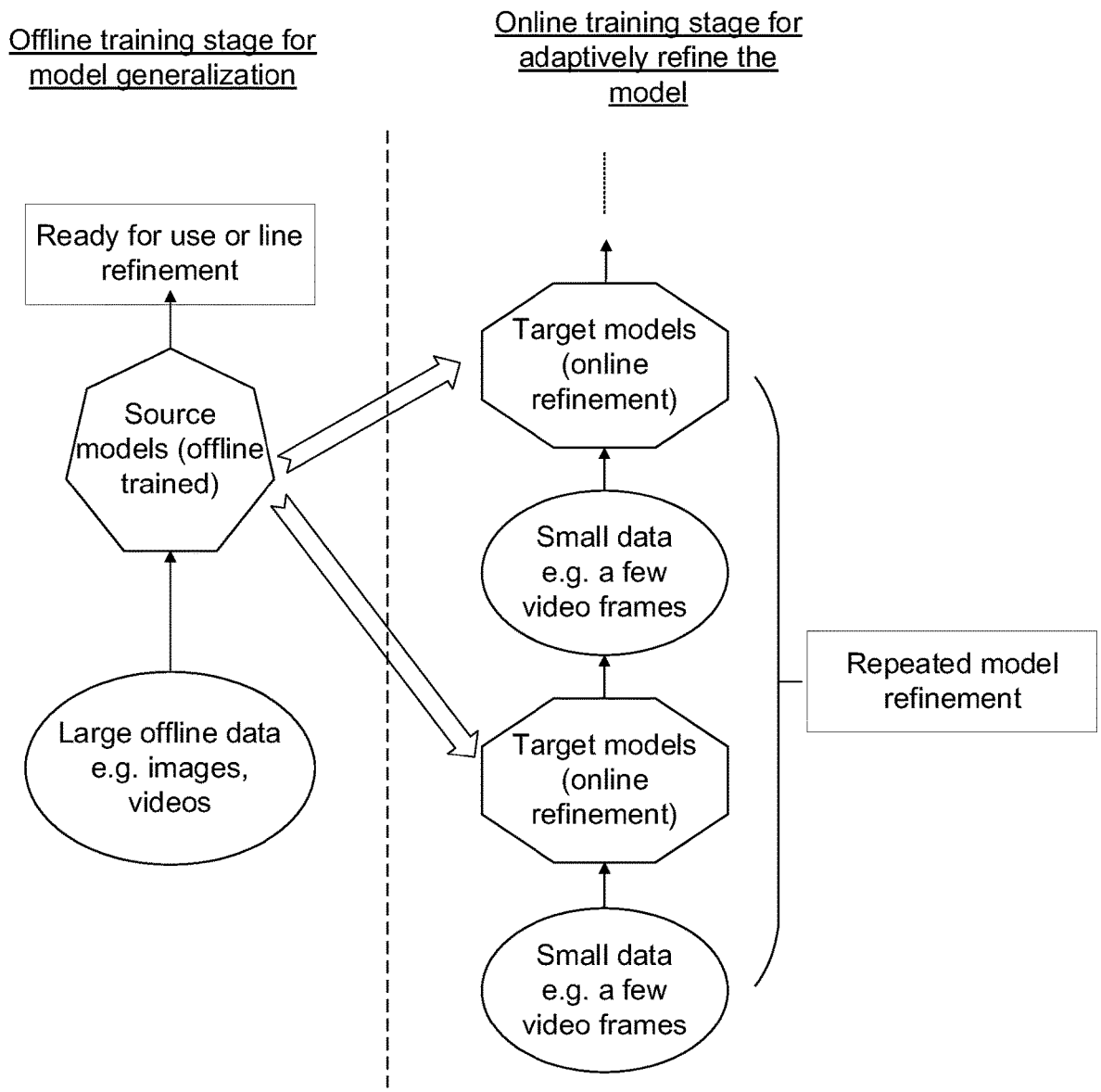
FIG. 8 illustrates a hybrid training framework in accordance with some implementations of the present disclosure.

FIG. 8 illustrates a hybrid training framework in accordance with some implementations of the present disclosure. As shown in the FIG. 8, one or multiple models are first offline trained with large amount of image or video data which have diverse data characteristics, then the models are repeatedly refined by online training with small amount of data. The purpose of the online training is to reduce the network complexity such that the network may better overfit the small amount of data within each refinement period. The network complexity can be reduced by limiting the number of trainable layers, parameters, or weights within the network, or by setting a suitable dynamic range of those trainable parameters or weights.

Figure 9A:
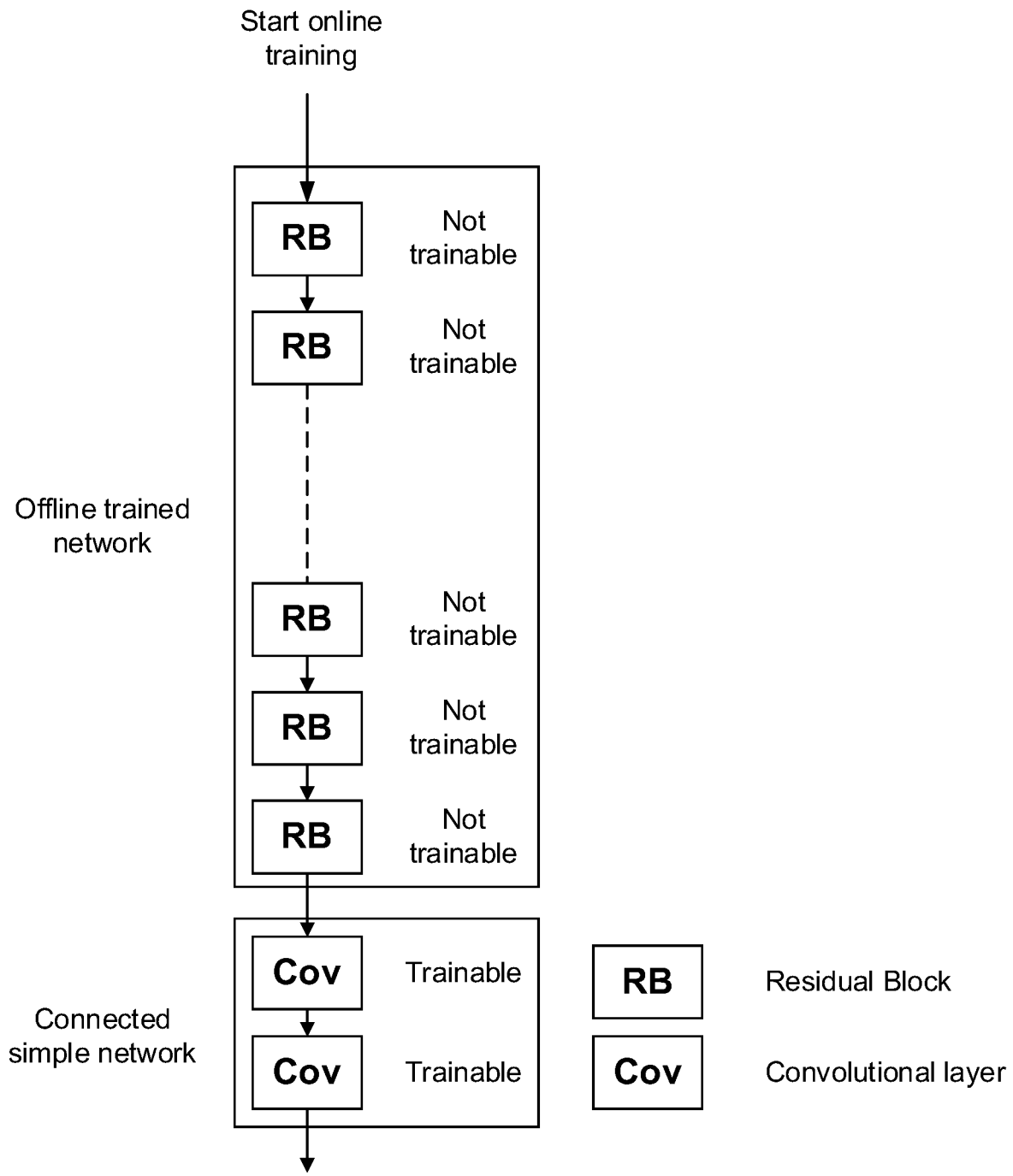
FIG. 9A illustrates an example of online training on an offline trained network and a simple neural network connected to the offline trained network in accordance with some implementations of the present disclosure.
Figure 9B:
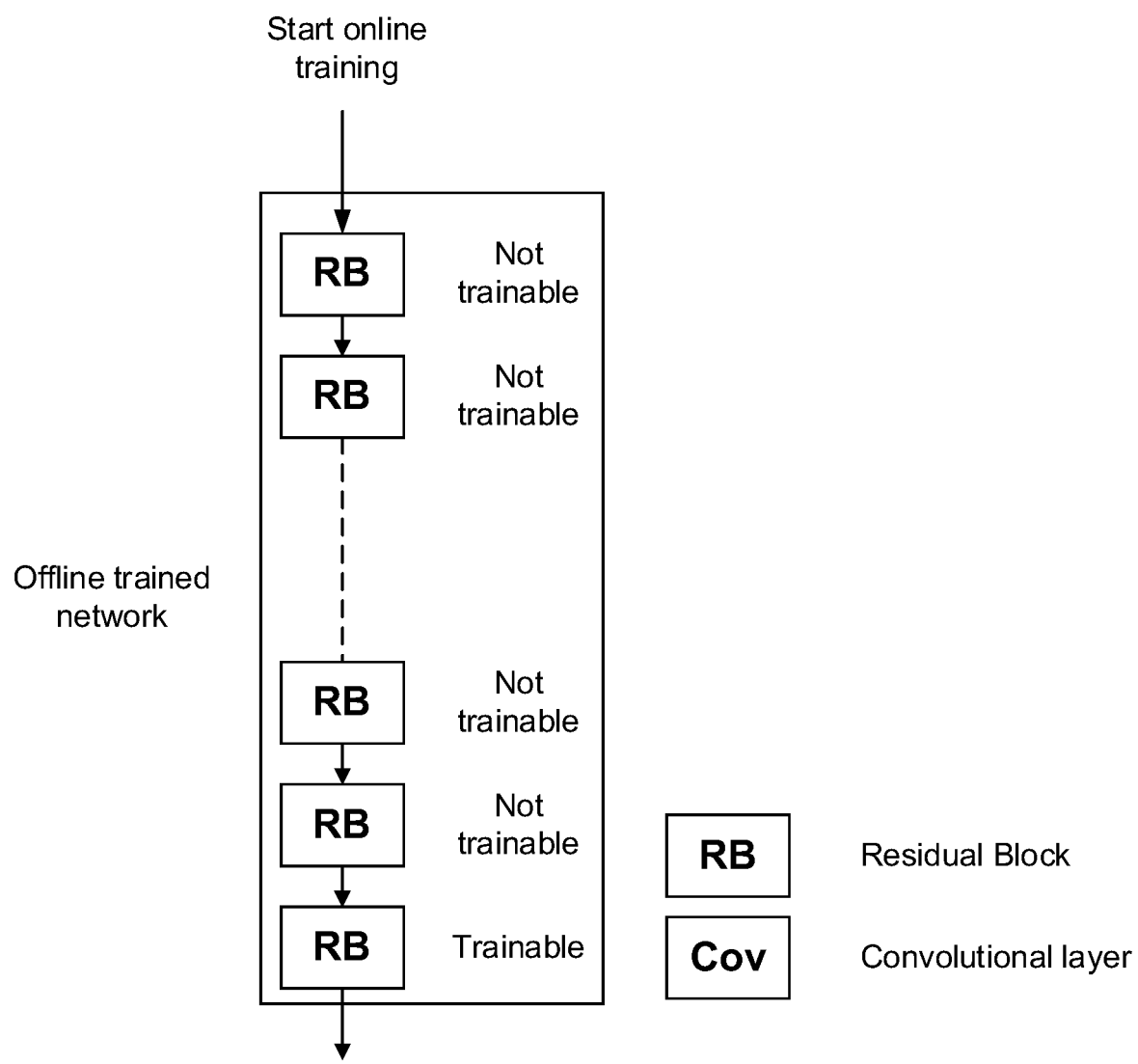
FIG. 9B illustrates an example of online training on an offline trained network in accordance with some implementations of the present disclosure.
Figure 9C:
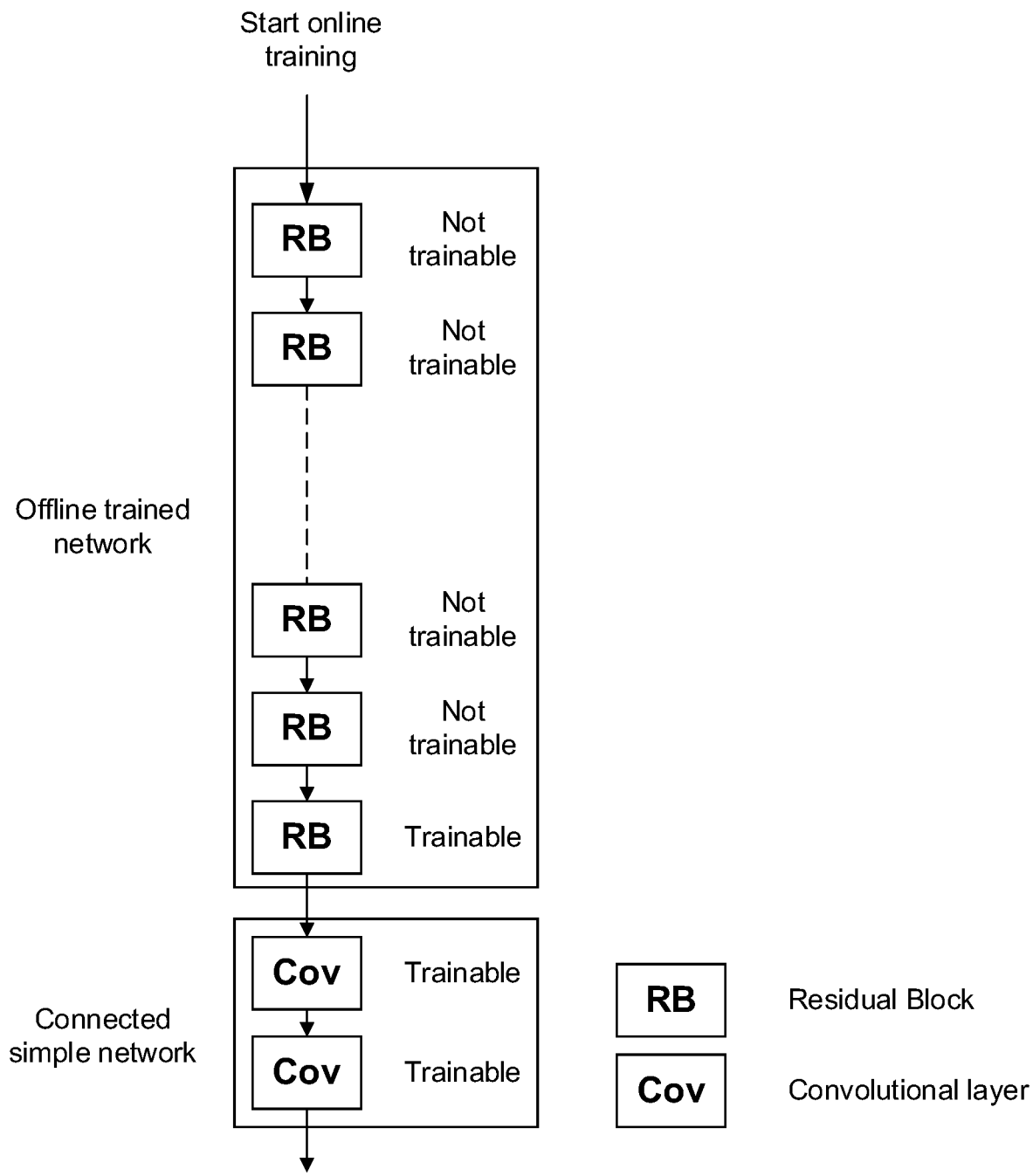
FIG. 9C illustrates an example of online training on an offline trained network and a simple neural network connected to the offline trained network in accordance with some implementations of the present disclosure.

FIGS. 9A-9D illustrate examples on how to perform online training on top of an offline trained network and/or a simple neural network connected to the offline trained network. As shown in the FIGS. 9A-9D, a simple neural network connected to the offline trained network may be trained at the online training stage as shown in FIG. 9A, or a subset of layers within the offline trained network are refined as shown in FIG. 9B, or both the simple neural network and a subset of layers within the offline trained network are trained at the online training stage as shown in FIG. 9C.

Transmission of the Online Trained Parameters or Weights

The output after each online training is a limited size of network parameters or weights. To reduce the signaling overhead, the parameters or weights need to be compressed before written into the bitstream. The compression method may be loss-less, lossy, or a combination of loss-less compression and lossy compression.

In one or more examples, even the updated parameters may be large and sensitive to the fluctuations of the input data due to overfitting, parameter pruning and quantization can still be performed. However, in order to maintain the sensitivity, manual setup of the sensitivity is beneficial and doable because the number of layers are typically small.

In one or more examples, instead of directly signaling the updated parameters, mean-shift or weight sharing like methods can be used to as preprocessing step. Also, the difference before and after the parameter update may be derived and constructed as a differential map, which can further reduce the bits to signal the updated parameters.

Interactions with Other Existing In-Loop Filters

If the networks trained for the video codec are used as an in-loop filter, the updated parameters after online training may be used to guide the training of other in-loop filters. For example, for adaptive in-loop filter (ALF), the derived filter coefficients may be extended or tailored to approximate the updated parameters. Once ALF filter coefficients are refined, the updated neural network parameters may not need to be signaled, not only saving bits but also reduce the processing delay due to using the neural network model filtering.

Constrained Online Training Process

Considering the wide variety of input video contents and the limitation of the training data set used for offline training, online training based update of the parameters/weights is proposed in previous sections. As shown in the FIGS. 9A-9D, the update may be performed on a newly added small network as shown in FIG. 9A, or on a few layers within the offline trained network as shown in FIG. 9B, or both as shown in FIG. 9C. This type of online training is to restrict the training complexity as well as the number of updated parameters/weights from the network structure perspective.

In one aspect of the present disclosure, regularization based constraint is proposed for online training process. In some examples, regularization is applied using a dynamic range. In one or more examples, if the trainable parameters/weights in the online training process aim to update or refine an offline trained network, the dynamic range control is applied to the parameter/weight difference before and after the online training. For example, for any parameter/weight, the absolute value is X before online training. During the online training process, the dynamic range may be regularized as Y. In this case, any parameter/weight that is updated during online training is clipped by the range of [X−Y, X+Y]. After the clipping, this parameter may be updated/refined again by a new round of online training process or fixed at this value without further update.

In one or more examples, if the trainable parameters/weights are from a newly added small network, which is not trained during the offline process, the dynamic range control is applied to the parameter/weight itself. For example, for any parameter/weight, the value after online training is clipped by a pre-defined range such as [−R, R], where R is the maximum allowed limit. After the clipping, this parameter may be updated/refined again by a new round of online training process or fixed at this value without further update.

In some examples, regularization is applied using a parameter category. When online training is performed, the parameters/weights within a trainable neural layer may be updated differently. In one or more examples, the parameters/weights within a trainable neural layer are classified as different categories.

In one or more examples, the classification may be dependent on the intensity value of each parameter/weight. In this case, different parameters/weights may be assigned to different bands, where each band is a range of intensity value. For example, two bands may be predefined, and the absolute value below a certain threshold is one band, and above the threshold is another band.

In one or more examples, the classification may be dependent on the role in a neuron, e.g., weights and biases.

Furthermore, based on a specified classification method, the parameters/weights in different classes may be updated differently. In one or more examples, the parameters may be divided into two or more bands based on the absolute values of the parameters. The two or more bands may include a high band and a low band. For example, the parameters in the high band (the range in this band is in a high end) may be updated with larger dynamic range, while the parameters in the low band (the range in this band is in a low end) may be updated within smaller dynamic range. For example, when a dynamic range is 0, it means the update is disabled, or this parameter is not updated/refined.

In some examples, the parameters in some categories may be fixed during the online training. For example, to reduce the weight update signaling, only the bias terms of a neural layer are updated, while the weights are not. Alternatively, only the weights or biases with larger value may be updated during the online training.

In some examples, regularization is applied using a parameter location. For example, when a neural network layer is updated during online training, this layer may have multiple channels. In one or more examples, a subset of channels may be selected as trainable during the online training process.

In some examples, regularization is applied using a loss function. During the online training, the trainable parameters/weights are updated or trained based on the loss function. In some examples, if the trainable parameters/weights are from the offline trained neural layers, the difference of the parameters/weights between before and after each round of online training epoch is used to generate a penalty term, which can be added on the existing loss function to encourage smaller difference after update. An epoch may indicate training the neural network with all the training data for one cycle.

In some other examples, if the trainable parameters/weights are from the newly added neural layers, the value of the parameters/weights is used to generate a penalty term, which can be added on the existing loss function to encourage smaller parameters/weights.

In another aspect of the present disclosure, post-processing based constraint is proposed for online training process. In some examples, the post-processing based constraint may be implemented using value approximation. Once online training process is finished, a subset of the trainable parameters/weights may be updated or newly trained with a new value.

In some examples, for the updated/refined parameters/weights, which are previously trained in offline stage, the update difference of each parameter/weight may be quantized before the compression. Alternatively, the update difference of one parameter/weight may be approximated to a specific value, such as to the power of 2. In another example, when the update difference is below a threshold, the update difference is set to 0.

In some examples, regularization of the update difference may be implemented using a look up table (LUT). Instead of directly signaling the values of update difference, a set of LUT indexed values may be signaled. In one example, a set of quantized or not quantized update difference values may be represented as (x1, x2, . . . xn), where the difference between x1 and xn represents the largest update difference value may be allowed, and the index values are represented as (1, . . . , n).

In some examples, the updated/refined parameters/weights which are previously trained in offline stage may be classified based on parameter categories. Accordingly, the update differences corresponding to parameters in difference classes or bands may be approximated differently.

In other examples, for the newly trained parameters/weights, which are from a new network only trained during online process, the value of each parameter/weight may be quantized before the compression. Alternatively, the value of one parameter/weight may be approximated to a specific value, such as to the power of 2. In another example, when the value of one parameter/weight is below a threshold, the value is set to 0.

In some examples, regularization of the newly trained parameters/weights may be implemented using an LUT. The implementation of the LUT in this case may be similarly designed as the update difference for updated/refined parameters/weights.

In some examples, the newly trained parameters/weights from the new network only trained during online process may be classified based on parameter categories. Accordingly, the values of parameters/weights in different classes or bands may be approximated differently.

It is proposed that all above proposed techniques may be used in any combination.

Figure 10:
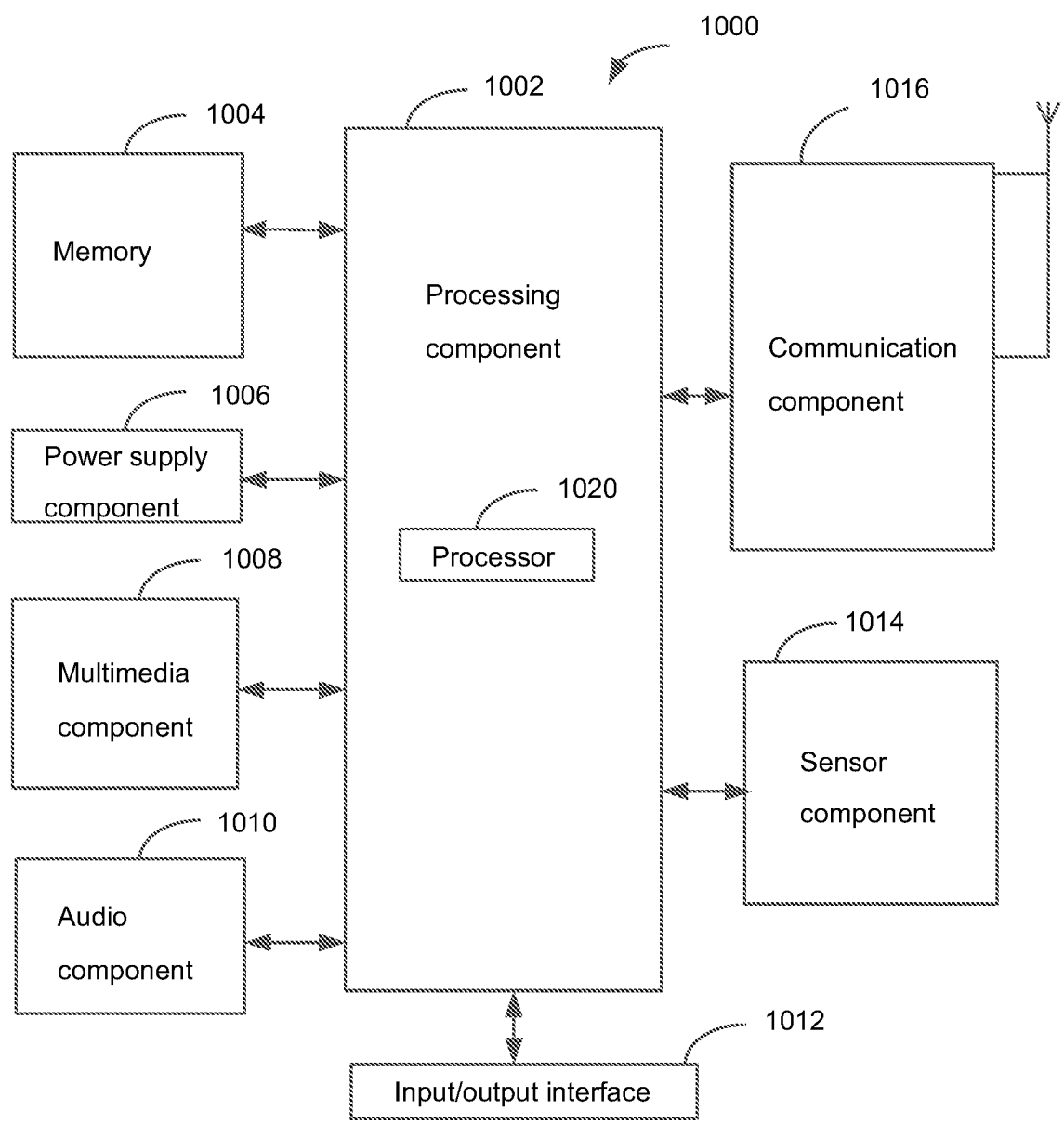
FIG. 10 is a block diagram illustrating an apparatus for hybrid training on neural networks for video coding in accordance with some implementations of the present disclosure.

FIG. 10 is a block diagram illustrating an apparatus for hybrid training on neural networks for video coding in accordance with some implementations of the present disclosure. The apparatus 1000 may be a terminal, such as a mobile phone, a tablet computer, a digital broadcast terminal, a tablet device, or a personal digital assistant.

As shown in FIG. 10, the apparatus 1000 may include one or more of the following components: a processing component 1002, a memory 1004, a power supply component 1006, a multimedia component 1008, an audio component 1010, an input/output (I/O) interface 1012, a sensor component 1014, and a communication component 1016.

The processing component 1002 usually controls overall operations of the apparatus 1000, such as operations relating to display, a telephone call, data communication, a camera operation, and a recording operation. The processing component 1002 may include one or more processors 1020 for executing instructions to complete all or a part of steps of the above method. Further, the processing component 1002 may include one or more modules to facilitate interaction between the processing component 1002 and other components. For example, the processing component 1002 may include a multimedia module to facilitate the interaction between the multimedia component 1008 and the processing component 1002.

The memory 1004 is configured to store different types of data to support operations of the apparatus 1000. Examples of such data include instructions, contact data, phonebook data, messages, pictures, videos, and so on for any application or method that operates on the apparatus 1000. The memory 1004 may be implemented by any type of volatile or non-volatile storage devices or a combination thereof, and the memory 1004 may be a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or a compact disk.

The power supply component 1006 supplies power for different components of the apparatus 1000. The power supply component 1006 may include a power supply management system, one or more power supplies, and other components associated with generating, managing and distributing power for the apparatus 1000.

The multimedia component 1008 includes a screen providing an output interface between the apparatus 1000 and a user. In some examples, the screen may include a Liquid Crystal Display (LCD) and a Touch Panel (TP). If the screen includes a touch panel, the screen may be implemented as a touch screen receiving an input signal from a user. The touch panel may include one or more touch sensors for sensing a touch, a slide and a gesture on the touch panel. The touch sensor may not only sense a boundary of a touching or sliding actions, but also detect duration and pressure related to the touching or sliding operation. In some examples, the multimedia component 1008 may include a front camera and/or a rear camera. When the apparatus 1000 is in an operation mode, such as a shooting mode or a video mode, the front camera and/or the rear camera may receive external multimedia data.

The audio component 1010 is configured to output and/or input an audio signal. For example, the audio component 1010 includes a microphone (MIC). When the apparatus 1000 is in an operating mode, such as a call mode, a recording mode and a voice recognition mode, the microphone is configured to receive an external audio signal. The received audio signal may be further stored in the memory 1004 or sent via the communication component 1016. In some examples, the audio component 1010 further includes a speaker for outputting an audio signal.

The I/O interface 1012 provides an interface between the processing component 1002 and a peripheral interface module. The above peripheral interface module may be a keyboard, a click wheel, a button, or the like. These buttons may include but not limited to, a home button, a volume button, a start button, and a lock button.

The sensor component 1014 includes one or more sensors for providing a state assessment in different aspects for the apparatus 1000. For example, the sensor component 1014 may detect an on/off state of the apparatus 1000 and relative locations of components. For example, the components are a display and a keypad of the apparatus 1000. The sensor component 1014 may also detect a position change of the apparatus 1000 or a component of the apparatus 1000, presence or absence of a contact of a user on the apparatus 1000, an orientation or acceleration/deceleration of the apparatus 1000, and a temperature change of apparatus 1000. The sensor component 1014 may include a proximity sensor configured to detect presence of a nearby object without any physical touch. The sensor component 1014 may further include an optical sensor, such as a CMOS or CCD image sensor used in an imaging application. In some examples, the sensor component 1014 may further include an acceleration sensor, a gyroscope sensor, a magnetic sensor, a pressure sensor, or a temperature sensor.

The communication component 1016 is configured to facilitate wired or wireless communication between the apparatus 1000 and other devices. The apparatus 1000 may access a wireless network based on a communication standard, such as WiFi, 4G, or a combination thereof. In an example, the communication component 1016 receives a broadcast signal or broadcast related information from an external broadcast management system via a broadcast channel. In an example, the communication component 1016 may further include a Near Field Communication (NFC) module for promoting short-range communication. For example, the NFC module may be implemented based on Radio Frequency Identification (RFID) technology, infrared data association (IrDA) technology, Ultra-Wide Band (UWB) technology, Bluetooth (BT) technology and other technology.

In an example, the apparatus 1000 may be implemented by one or more of Application Specific Integrated Circuits (ASIC), Digital Signal Processors (DSP), Digital Signal Processing Devices (DSPD), Programmable Logic Devices (PLD), Field Programmable Gate Arrays (FPGA), controllers, microcontrollers, microprocessors, or other electronic elements to perform the above method. A non-transitory computer readable storage medium may be, for example, a Hard Disk Drive (HDD), a Solid-State Drive (SSD), Flash memory, a Hybrid Drive or Solid-State Hybrid Drive (SSHD), a Read-Only Memory (ROM), a Compact Disc Read-Only Memory (CD-ROM), a magnetic tape, a floppy disk, etc.

FIG. 11 is a flowchart illustrating a process for hybrid training on neural networks for video coding in accordance with some implementations of the present disclosure.

In step 1101, the processor 1020 obtains, in an offline training stage, an offline trained network by training a neural network offline. In some examples, the neural network may be trained using a plurality of first data sets. As shown in FIG. 8, the plurality of first data sets may include large offline data, e.g., images, videos.

In step 1102, the processor 1020 refines, in an online training stage, a plurality of neural network layers with constraint on a plurality of parameters of the plurality of neural network layers. Here, the constraint may represent a set of methods used to minimize the neural network parameter changes before and after the hybrid training. The methods may be various adaptively depending on specific purpose of different experiments in the art. For example, the constraint may include a weight constraint that checks the size of the weights, and if the size exceeds a predefined limit, the weights are rescaled so that their size is below the limit or between a range. In one or more embodiments, depending on where the constraint is applied, there are two types of constraints: regularization-based constraint and post processing based constraint. In the regularization-based constraint, the proposed constraint methods are applied during the online training process. In the post processing based constraint, the proposed constraint methods are applied after the online training process.

Figure 9D:
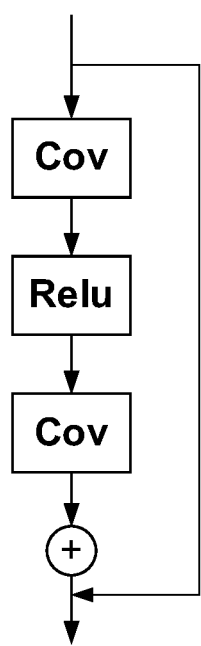
FIG. 9D illustrates an example of a residual block included in an offline trained network in accordance with some implementations of the present disclosure.

In some examples, the plurality of neural network layers may include at least one neural network layer in the offline trained network or in a simple neural network connected to the offline trained network, as shown in FIGS. 9A-9C. As shown in FIG. 9A, the offline trained network or model includes multiple residual blocks (RBs). Each RB may have the same structure as shown in FIG. 9D. As shown in FIG. 9D, the RB include two convolutional layers and a Rectified Linear Unit (Relu) layer that is sandwiched between the two convolutional layers. A simple neural network that is connected to the offline trained network may include, but not limited to, two convolutional layers. Online training may be performed on: only the two convolutional layers in the simple neural network (FIG. 9A), only the last RB in the offline trained network (FIG. 9B), or the last RB in the offline trained network and the two convolutional layers in the simple neural network (FIG. 9C).

In some examples, the processor 1020 may repeatedly refine the plurality of neural network layers using a plurality of second data sets. In some examples, the plurality of second data sets may include coding information, video content, and/or information other than video frames, where the coding information may include temporal layer information, the video content may include a plurality of patches extracted based on regions of interest from a video frame, and the information other than video frames may include motion information.

In some examples, the offline trained network may include more neural network layers than the plurality of neural network layers that are refined, as shown in FIGS. 9A-9C.

In some examples, the simple neural network may include less neural network layers than the offline trained network.

In some examples, the plurality of first data sets may include more data than the plurality of second data sets. The plurality of second data sets may be small amount of data as shown in FIG. 8, e.g., a few video frames.

In some examples, regularization based constraint may be applied on the plurality of parameters of the plurality of neural network layers refined in the online training stage.

In some examples, the plurality of parameters may be regularized using a dynamic range before and after each online training epoch.

In some examples, a first parameter of one or more neural network layers in the offline trained network (e.g., trainable RB in the offline trained network) may be clipped by the dynamic range based on a value of the parameters before an online training epoch and a predetermined value. The first parameter may be one parameter of the one or more neural network layers in the offline trained network (e.g., trainable RB in the offline trained network). For example, for any parameter/weight, the absolute value is X before online training. During the online training process, the dynamic range may be regularized as Y.

In this case, any parameter/weight that is updated during online training is clipped by the range of [X−Y, X+Y]. After the clipping, this parameter may be updated/refined again by a new round of online training process/epoch or fixed at this value without further update.

In some examples, a second parameter of the at least one neural network layer in the simple neural network connected to the offline trained network may be clipped by a predefined range. For example, the second parameter may be one trainable parameter/weight from a newly added small network, which is not trained during the offline process, as shown in FIG. 9A or 9B. The value of the second parameter after online training may be clipped by a pre-defined range such as [−R, R].

In some examples, a parameter category of the plurality of parameters of neural network layers may be regularized, that is, regularization may be based on parameter categories. For examples, the plurality of parameters may be classified into different bands. Parameters in each band may be of a same parameter category. Parameters in different bands may be updated differently.

In some examples, the plurality of parameters may be classified based on intensity values, roles in neurons (e.g., weights and biases), etc.

In some examples, different bands may include a first band a second band, where one or more parameters in the first band may be regularized using a first dynamic range and one or more parameters in the second band may be regularized using a second dynamic range, and the first dynamic range may be greater than the second dynamic range.

For example, the parameters may be divided into two or more bands based on the absolute values of the parameters. The two or more bands may include a high band and a low band. For example, the parameters in the high band (the range in this band is in a high end) may be updated with larger dynamic range, while the parameters in the low band (the range in this band is in a low end) may be updated within smaller dynamic range.

In some examples, parameters in one or more bands may be skipped. For example, the parameters in some categories may be fixed during the online training. For example, to reduce the weight update signaling, only the bias terms of a neural layer are updated, while the weights are not. Alternatively, only the weights or biases with larger value may be updated during the online training.

Furthermore, in some examples, a band may be further divided into multiple sub-bands including a first sub-band and a second sub-band. Parameters in the first sub-band may be updated while parameters in the second sub-band may be not updated, where the parameters in the first sub-band may have higher values than the parameters in the second sub-band. For examples, to reduce the weight update signaling, only the bias terms of a neural layer are updated, while the weights are not. Alternatively, only the weights or biases with larger value may be updated during the online training.

In some examples, one or more parameters of a subset of channels may be updated. The subset of channels may include channels that are part of a plurality of channels included in a neural network layer of the plurality of neural network layers.

In some examples, a penalty term may be generated based on a difference of a first parameter of the at least one neural network layer in the offline trained network between before and after an online training epoch and an updated loss function may be obtained by adding the penalty term to an existing loss function. In some examples, if the trainable parameters/weights are from the offline trained neural layers, the difference of the parameters/weights between and after each round of online training epoch is used to generate a penalty term, which can be added on the existing loss function to encourage smaller difference after update.

In some examples, a penalty term may be generated based on a value of a second parameter of the at least one neural network layer in the simple neural network connected to the offline trained network and an updated loss function may be obtained by adding the penalty term to an existing loss function. For examples, if the trainable parameters/weights are from the newly added neural layers, the value of the parameters/weights is used to generate a penalty term, which can be added on the existing loss function to encourage smaller parameters/weights.

In some examples, post-processing based constraint may be applied on the plurality of parameters after the online training stage. That is, after the online training, post-processing based constraint may be applied to the plurality of parameters of the online trained neural network before transmitting the plurality of parameters to a decoder.

In some examples, post-processing based constraint may be implemented by value approximating. For example, an update difference may be approximated to a predefined value, where the update difference may be a difference between a first value of at least one parameter of the at least one neural network layer in the offline trained network before the online training and a second value of the at least one parameter after the online training and the at least one parameter may be updated according to the update difference. For example, the predefined value may be the power of 2.

In some examples, the update difference may be set to be 0 in response to determining that the update difference is smaller than a predefined threshold. For examples, when the update difference is below a threshold, the update difference may be set to be 0 such that the corresponding parameter remains the same as before the online training.

In some examples, a parameter of the at least one neural network layer in the simple neural network connected to the offline trained network may be approximated to a predefined value. For example, for the newly trained parameters/weights, which are from a new network only trained during online process, the value of each parameter/weight may be approximated to a specific value, such as to the power of 2.

In some examples, the value of the parameter may be set to be 0 in response to determining that value of the parameter is smaller than a predefined threshold. For examples, when the value of the parameter is below a threshold, the value of the parameter may be set to be 0.

In some other examples, there is provided a non-transitory computer readable storage medium 1004, having instructions stored therein. When the instructions are executed by one or more processors 1020, the instructions cause the processor to perform any method as described in FIG. 11 and above.

The description of the present disclosure has been presented for purposes of illustration and is not intended to be exhaustive or limited to the present disclosure. Many modifications, variations, and alternative implementations will be apparent to those of ordinary skill in the art having the benefit of the teachings presented in the foregoing descriptions and the associated drawings.

The examples were chosen and described in order to explain the principles of the disclosure, and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

The invention claimed is:

1. A method for video coding, comprising:
obtaining, in an offline training stage, an offline trained network by training a neural network offline;
refining, in an online training stage, a plurality of neural network layers with constraint on a plurality of parameters of the plurality of neural network layers, wherein the plurality of neural network layers comprise at least one neural network layer in the offline trained network or in a simple neural network connected to the offline trained network; and
performing video coding using the plurality of refined neural network layers,
wherein refining the plurality of neural network layers with the constraint on the plurality of parameters comprises:
classifying the plurality of parameters into different categories and assigning the different categories into different bands; and
updating one or more parameters in the different bands differently.

2. The method of claim 1, wherein classifying the plurality of parameters into different categories comprises:
classifying the plurality of parameters based on one of followings: intensity values of the plurality of parameters, or roles of neurons.

3. The method of claim 1, wherein the different bands comprise a first band and a second band, one or more parameters in the first band are updated using a first dynamic range and one or more parameters in the second band are updated using a second dynamic range, and the first dynamic range is greater than the second dynamic range.

4. The method of claim 1, further comprising:
skipping updating one or more parameters in one or more bands.

5. The method of claim 1, wherein updating one or more parameters in the different bands differently comprises:
dividing a band into a first sub-band and a second sub-band; and
updating one or more parameters in the first sub-band without updating one or more parameters in the second sub-band, wherein the one or more parameters in the first sub-band have higher values than the one or more parameters in the second sub-band.

6. The method of claim 1, further comprising:
applying post-processing based constraint on the plurality of parameters after the online training stage.

7. The method of claim 6, wherein applying the post-processing based constraint on the plurality of parameters after the online training stage comprises:
approximating an update difference to a predefined value, wherein the update difference is a difference between a first value of at least one parameter of the at least one neural network layer in the offline trained network before the online training and a second value of the at least one parameter after the online training; and
updating the at least one parameter according to the updated difference.

8. The method of claim 7, wherein approximating the update difference to a predefined value comprises:
approximating the update difference by quantizing the update difference.

9. The method of claim 7, wherein approximating the update difference to a predefined value comprises:
in response to determining that the update difference is smaller than a predefined threshold, determining that the update difference is 0.

10. The method of claim 6, wherein applying the post-processing based constraint on the plurality of parameters after the online training stage comprises:
approximating a parameter of the at least one neural network layer in the simple neural network connected to the offline trained network to a predefined value.

11. The method of claim 10, wherein approximating the parameter of the at least one neural network layer in the simple neural network connected to the offline trained network to a predefined value comprises:
approximating the parameter by quantizing the parameter.

12. The method of claim 10, wherein approximating the parameter of the at least one neural network layer in the simple neural network connected to the offline trained network to a predefined value comprises:

in response to determining that a value of the parameter is smaller than a predefined threshold, determining that the value of the parameter is 0.

13. An apparatus for video coding, comprising:
one or more processors; and
a memory configured to store instructions executable by the one or more processors,
wherein the one or more processors, upon execution of the instructions, are configured to perform a method comprising:
obtaining, in an offline training stage, an offline trained network by training a neural network offline;
refining, in an online training stage, a plurality of neural network layers with constraint on a plurality of parameters of the plurality of neural network layers, wherein the plurality of neural network layers comprise at least one neural network layer in the offline trained network or in a simple neural network connected to the offline trained network; and
performing video coding using the plurality of refined neural network layers,
wherein refining the plurality of neural network layers with the constraint on the plurality of parameters comprises:
classifying the plurality of parameters into different categories and assigning the different categories into different bands; and
updating one or more parameters in the different bands differently.

14. A non-transitory computer-readable storage medium storing a bitstream generated or to be decoded by using a method comprising:
obtaining, in an offline training stage, an offline trained network by training a neural network offline;
refining, in an online training stage, a plurality of neural network layers with constraint on a plurality of parameters of the plurality of neural network layers, wherein the plurality of neural network layers comprise at least one neural network layer in the offline trained network or in a simple neural network connected to the offline trained network; and
performing video coding using the plurality of refined neural network layers,
wherein refining the plurality of neural network layers with the constraint on the plurality of parameters comprises:
classifying the plurality of parameters into different categories and assigning the different categories into different bands; and
updating one or more parameters in the different bands differently.

* * * * *